March 2, 1965 G. D. CERF 3,172,081
MAGNETICALLY RECORDED CHARACTERS AND CODE; AND
SYSTEM FOR READING SAME
Filed Sept. 6, 1960

INVENTOR.
GUSTAVE D. CERF.

BY
ATTORNEY

United States Patent Office 3,172,081
Patented Mar. 2, 1965

3,172,081
MAGNETICALLY RECORDED CHARACTERS AND CODE; AND SYSTEM FOR READING SAME
Gustave D. Cerf, East Norwalk, Conn., assignor to Sperry Rand Corporation, New York, N.Y., a corporation of Delaware
Filed Sept. 6, 1960, Ser. No. 54,209
11 Claims. (Cl. 340—146.3)

This invention relates generally to character recognition systems and more specifically to a system wherein documents carry information printed in ink containing magnetic material, said information being in both visually identifiable form and code form. The documents may be machine read and the intelligence thereon automatically converted into a form suitable for further automatic processing.

Everyday business practice requires handling of a great many documents and processing of the large amounts of information contained therein. Examples of such are found in banks, brokerage offices, clearing houses, etc. Great savings of time in handling of documents and processing of the information can be effected by recording data on the documents in magnetic ink. The information may then be automatically read and transmitted to the proper document handling or data processing machine, thus eliminating much of the human processing of documents. This is advantageous in that it not only speeds up document handling, but it provides greater accuracy by reducing the possibility of human error. However, since human handling of the documents is also required, it is necessary that the data be visually as well as machine readable.

Several ways of imprinting magnetic information on documents are disclosed in co-pending application number 767,646, now Patent Number 3,113,298 filed October 16, 1958, assigned to Sperry Rand Corporation. This invention is an improvement thereover and provides for compact imprinting of the magnetically recorded information while providing maximum visual clarity. Critical positioning of the sensing device is also minimized as all magnetically imprinted information may be sensed since only those desired portions will be converted to a usable form.

Accordingly, it is an object of this invention to provide a document having information magnetically imprinted thereon in a compact manner, such information being in the form of machine readable symbols and visually identifiable characters printed in-line.

Another object of this invention is to provide an improved system for reading magnetically recorded information in the form of in-line, visually identifiable characters and coded symbols therefor.

A further object of this invention is to provide an improved system for reading only the magnetically recorded code symbols which are in-line with the visually identifiable magnetically recorded characters, which they represent.

Another object of this invention is to provide an improved system for reading magnetically coded printed symbols and blocking magnetically printed visually identifiable symbols, which are represented by the coded symbols.

Still other objects and advantages of the invention will be apparent from the specification.

Generally speaking, in accordance with this invention, a document is provided having information printed thereon with magnetic ink which is capable of being both visually and automatically machine read. Each information unit is divided into two portions, the first portion being magnetic indicia, preferably in a shape of bars, forming a character code, and the second portion forming a visually identifiable character represented by the bars.

Each line of magnetically recorded information on the document is serially sensed by a magnetic sensing device. During the time that the coded portion of each information unit passes the magnetic sensing device, a generator supplies pulses to a gate. The pulses provided by the coded portion of the unit are also supplied to the gate and coincidence of pulses in the gate cause information to be transmitted therethrough for subsequent use. During the time that the visually identifiable portion of the information unit passes the magnetic sensing device, the generator supplies a pulse to a second gate which blocks any signals from the magnetic sensing device caused by the passage of the visually identifiable portion of the information unit. Thus, the magnetically recorded information is selectively read in that only the coded portion of each information unit is transmitted for subsequent use.

For a better understanding of the invention, reference is had to the following description taken in connection with the accompanying drawing, and its scope will be pointed out with particularity in the appended claims.

Figure 1:
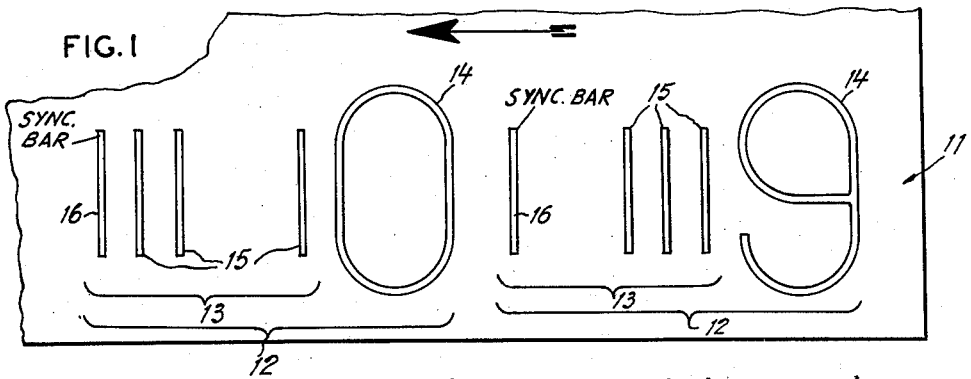
FIG. 1 shows two information units magnetically imprinted on a document in accordance with an embodiment of the invention.

Referring now to FIG. 1, a document 11 has information imprinted thereon with an ink containing magnetizable material, such as the various oxides of iron, nickel, etc., and magnetized in any manner well known in the art. The information is in the form of information units 12, each information unit 12 being divided into two portions, a coded portion 13 and a visually identifiable portion 14. Coded portion 13 is in the form of magnetic bars, while the visually identifiable portion 14 is in the form of the alphabetic or numeric symbols represented by the coded portion. Document 11 travels in the direction indicated by the arrow and the entire magnetically imprinted area containing information units 12 pass a magnetic sensing device 25 (FIG. 3) and are sensed thereby, as will be described.

The particular code shown consists of five information bits 15 plus a synchronizing bit 16, each information bit being represented by the presence or absence of a magnetic bar. The synchronizing bit 16 is always present in the form of a magnetic bar. By combinations of the information bit, 32 different binary combinations may be formed. As an example, the coded portion 13 of the "0" shown in FIG. 1 consists of three magnetic bars 15 and two positions without bars which would provide the code 11001. The function of synchronizing bar 16, which forms the first bar of every coded portion 13 will be explained hereinbelow.

All imprinted magnetic information, whether it be in coded form or visually indentifiable from, will be sensed by the magnetic sensing device. The sensing device will provide output pulses of the form shown in FIG. 2. Large magnetic areas such as magnetic bars 15 or 16, or parts of the visually identifiable portion 14 will cause high peaks in the wave form, while other parts of visually identifiable portion 14 will cause signals of lesser intensity. The signals caused by the visually identifiable portion of information unit 12 forms no part of the magnetic code employed and must be prevented from reaching the data processing apparatus, where they would cause false operation.

Figure 2:
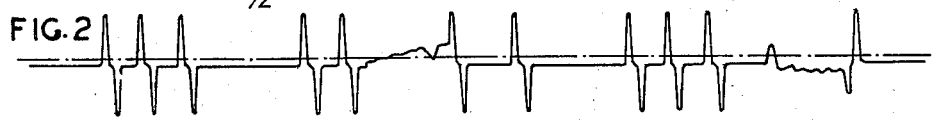
FIG. 2 shows the wave forms produced when the magnetically imprinted information units of FIG. 1, are sensed by a magnetic sensing device.
Figure 3:
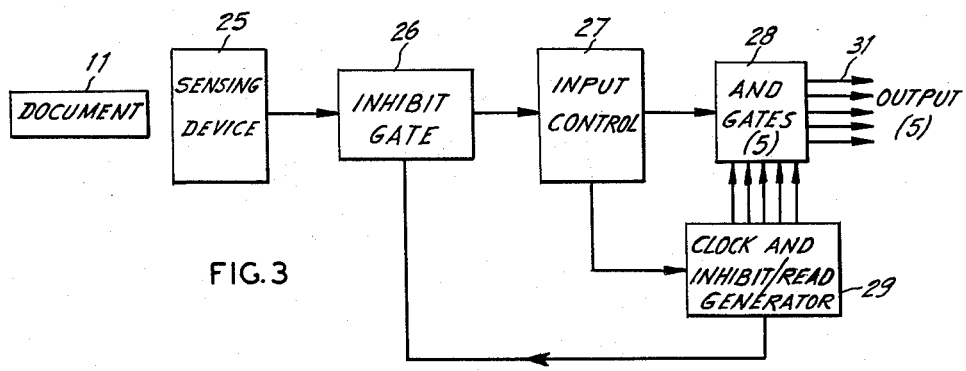
FIG. 3 is a block diagram of a device adapted to read documents magnetically imprinted as shown in FIG. 1.

Referring now to FIG. 3, document 11, having information magnetically imprinted thereon, is sensed by a magnetic sensing device 25. The output of sensing device 25, indicated in FIG. 2, is applied to a normally open INHIBIT gate 26. INHIBIT gate 26 may be of any well known type which allows pulses to pass therethrough unless INHIBIT gate is closed by a control pulse from another source. The pulses are then transmitted to a pulse shaper or input control 27 which shapes the pulses to a more suitable form in a well known manner. The outputs from input control 27 to the AND gates and clock and inhibit read generator 29 are illustrated at line I of FIG. 4, as a square or rectangular wave.

The pulse produced by synchronizing bar 16 (FIG. 1) forming the first bar of the coded portion of each information unit 12, provides a synchronizing pulse which is transmitted to a clock and inhibit/read generator 29. Generator 29 might be, by way of example, a series of six cascaded one shot multivibrator stages having appropriately chosen astable periods. The first five stages would apply pulses sequentially to five AND gates 28 and the sixth stage would provide the blanking pulse applied to INHIBIT gate 26. By appropriate coupling, the output of the first stage would be delayed to coincide with the passage of the first code position relative to sensing device 25. The multivibrator stages would be started by synchronizing pulse 16. A control within generator 29 would prevent further pulses produced by the sensing of information unit 12 from continually starting the multivibrator stages until a complete information unit 12 has passed sensing device 25. Although the synchronizing pulse is also transmitted to each of five AND gates 28 no output is provided since AND gates 28 are normally closed.

Once started by the sychronizing pulse, generator 29 thereupon consecutively transmits one pulse to each of the five AND gates, at a rate which corresponds to the rate of motion of document 11 relative to sensing device 25. AND gates 28 may be of any well known type and provide an output only upon the coincident application of two input signals thereto. During the time generator 29 supplies pulses to AND gates 28, coded portion 13 of information unit 12 is being sensed by sensing device 25 and causes pulses to be supplied, where bars are present, through input control 27 to each AND gate 28. Whenever coincidence of pulses from generator 29 and coded portion 13 occurs, an output will be provided on one of the five output paths 31. Thus, the output of the five AND gates taken together provide a five position binary code and can be transmitted to a document handling or data processing machine.

The five AND gates 28 sequentially receiving pulses from generator 29 and having five output paths 31, are shown by way of example. Serial output could be provided with one AND gate and one output path without departing from the principles of the invention.

After generator 29 has a supplied five consecutive pulses to AND gates 28, a pulse from the generator will thereupon be applied to INHIBIT gate 26 for a predetermined period. This predetermined period is sufficient to allow the visually identifiable portion 14 of information unit 12 to pass sensing device 25. Signals representing magnetic portions sensed by sensing device 25 during this period will be blocked by INHIBIT gate 26 which will be closed by the pulse received from generator 29. When the predetermined time has elapsed during which INHIBIT gate 26 is closed, generator 29 ceases operation and the INHIBIT gate will return to its normally open position to allow the next pulse to pass therethrough.

The cycle will be started again when the synchronizing bar 16 which forms the first bar of coded portion 13 of the next information unit 12, passes sensing device 25 causing a pulse to be transmitted to clock and inhibit/read generator 29, again starting the generator.

Figure 4:
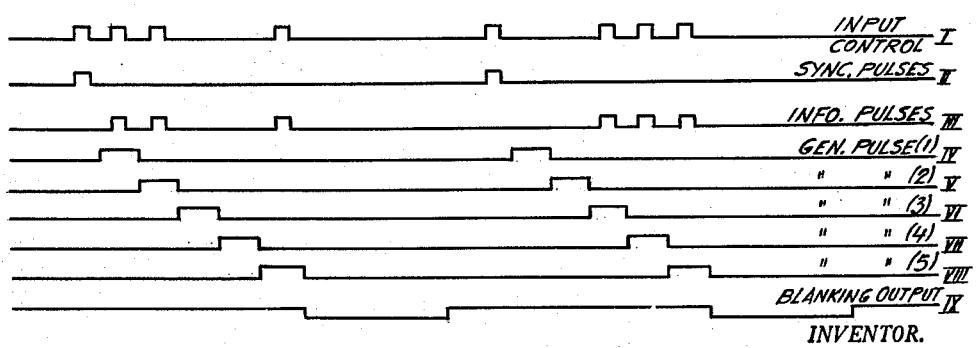
FIG. 4 is a timing diagram for the device of FIG. 3.

The timing of pulses produced by the device is more readily seen in FIG. 4. The diagram shown in FIG. 4 encompasses a period of time during which the information units shown in FIG. 1 pass and are sensed by the sensing device. Line I shows the pulses at the outputs of input control 27 which have been supplied thereto by sensing device 25. No pulses are shown for the visually identifiable portion of information unit 12 since INHIBIT gate 26 is closed during the time that this magnetically imprinted information is sensed by sensing device 25, thereby prohibiting pulses from reaching input control 27. Line II shows the synchronizing pulses derived from synchronizing bars 16 which start clock and inhibit/read generator 29 as each new information unit passes sensing device 25. Line III shows information pulses which have been shaped by input control 27 and are applied to five AND gates 28. In these examples, using a five bit information code, three of the possible information units are present. The binary code of 11001 represents the numeral "0" in FIG. 1 and the binary code of 00111 represents the numeral "9." Lines IV through VIII show the five consecutive generator pulses which are applied to five AND gates 28. The generator pulses are of longer duration than the information pulses to assure coincidence of pulses in AND gates 28.

Line IX shows the blanking pulse which is applied to INHIBIT gate 26 by generator 29 after the generator has supplied five pulses to AND gates 28.

Looking at the overall diagram of FIG. 4, it will be seen that coincidence between information pulses and generator pulses is possible only during the time which the coded portion 13 of information unit 12 is being sensed by sensing device 25. During the time the visually identifiable character portions are passing sensing device 25, a blanking output is coincidently applied to INHIBIT gate 26 which prevents any pulses from reach input control 27. When the synchronizing bar 16 is sensed, the pulse produced therefrom is able to pass through INHIBIT gate 26 since no blanking output is provided. However, it is not able to cause output through any of AND gates 28 since no generator pulse is provided at that time.

Thus, the magnetically recorded information is selectively read so that only the coded portion of each information unit is transmitted to the document handling or data processing machine. All other portions of the information unit are blocked.

The particular system described and shown herein has reference to the sensing of magnetically recorded information on a non-magnetized medium. The principles of the invention could be carried out equally as well having the information in other types of sensible symbols, such as those that may be photoelectrically read.

This application has particularly pointed out and distinctly claimed the part, improvement, or combination which is claimed as the invention or discovery, and there have been explained the principles thereof and the best mode contemplated for applying those principles so as to distinguish the invention from other inventions.

While there has been shown and described a preferred embodiment of the invention, it will be understood that modifications may be made without departing from the spirit and scope thereof, as will be clear to those skilled in the art.

What is claimed is:

1. A system for reading data comprising a support, data magnetically recorded on said support, said data being in the form of information units having a visually identifiable portion and a coded portion, a single means for sensing said information units and providing output signals in response thereto, gating means coupled to receive the output of said sensing means, a generator coupled to said gating means, said generator providing a chosen number of sequential pulses to said gating means while said coded portion is being sensed by said sensing means, said gating means providing output signals only upon coincidence of signals from said sensing means and said generator, and means coupled to said sensing means for blocking the output of said sensing means while said visually identifiable portions are being sensed by said sensing means.

2. The structure defined in claim 1 wherein said visually identifiable portion and coded portion of said information units are substantially in-line in the path of said sensing means.

3. A system for reading data comprising a support, data printed with magnetic ink on said support, said data being in the form of information units, each of said units having a visually identifiable portion and a coded portion, a single means for sensing said data and providing serial output signals in response thereto, gating means coupled to receive the output of said sensing means, a generator coupled to said gating means, said generator providing a chosen number of sequential pulses to said gating means while said coded portion is being sensed by said sensing means, said gating means providing output signals only upon coincidence of signals from said sensing means and said generator, and means associated with said sensing means for blocking the output of said sensing means while said visually identifiable portions are being sensed by said sensing means.

4. The structure defined in claim 3 wherein said support consists of a non-magnetizable medium.

5. The structure defined in claim 3 wherein said support consists of a non-magnetizable medium and said visually identifiable portion and coded portion of said information units are substantially in-line in the path of said sensing means.

6. A system for reading data comprising an information carrier, data magnetically recorded on said carrier, said data being in the form of information units, each of said units having a visually identifiable portion and a coded portion, a single means for sensing said information units and providing serial output signals in response thereto, inhibiting means coupled to said sensing means, gating means coupled to said sensing means through said inhibiting means for distributing pulses to selected output lines and means coupled to said gating means and said inhibiting means for generating pulses, said generating means responsive to the output of said sensing means, said generating means providing a predetermined number of sequential pulses to said gating means while said coded portion is being sensed by said sensing means, said gating means providing output signals only upon coincidence of signals from said sensing means and said generating means, said generating means further providing a pulse to said inhibiting means for blocking the output of said sensing means while said visually identifiable portion is being sensed by said sensing means.

7. A system for reading data comprising an information carrier having data magnetically imprinted on said carrier, said data being in the form of information units, each of said units having a visually identifiable portion and a coded portion, said coded portion having a synchronizing bar and positions for N code bars, a single means for sensing said information units and providing output signals in response thereto, inhibiting means coupled to said sensing means for selectively preventing the output of said sensing means passing through said inhibiting means, a plurality of output lines, gating means coupled to said sensing means through said inhibiting means for energizing said output lines in a predetermined pattern, a generator responsive to said synchronizing bar and providing N sequential pulses to said gating means while said code bar portion of said information unit is being sensed by said sensing means, said generator providing a pulse to said inhibit means for blocking the output of said sensing means while said visually identifiable portion is being sensed by said sensing means, said gating means providing output signals only upon coincidence of signals from said sensing means and said generator.

8. A system for reading data comprising a non-magnetizable medium, data magnetically imprinted on said medium, said data being in the form of information units, each of said units having a visually identifiable portion and a second portion in-line with said visually identifiable portion, said second portion having a synchronizing bar and positions for N code bars, a single means for sensing said information units and providing output signals in response thereto, inhibiting means coupled to the output of said sensing means, a pulse generator adapted to receive certain of the signals generated by said bars, a plurality of output lines and means for gating said lines, said generator being started by said synchronizing bar and providing N sequential pulses to said gating means, said generator further providing a pulse to said inhibit means for blocking the output of said sensing means while said visually identifiable portion is being sensed by said sensing means, and said gating means providing output signals only upon coincidence of signals from said sensing means and said generator.

9. In a document sensing system for reading magnetically recorded information having a visually readable portion and a coded portion, said coded portion including a synchronizing portion, a single means for sensing said recorded information and providing an output indicative of said coded portion, and in tandem, an inhibit gate, an input control circuit, and a plurality of parallel "and" gates, each of said "and" gates controlling separate output lines; a clock pulse generator, connections from said generator to each of said "and" gates and a connection from said input control circuit to said generator for starting operation thereof.

10. The combination claimed in claim 9 in which there is provided a regressive connection from the output of said clock pulse generator to said inhibit gate.

11. The combination claimed in claim 9 in which said clock pulse generator has means for delivering pulses in a predetermined sequence at predetermined times to each of said "and" gates.

References Cited in the file of this patent

UNITED STATES PATENTS

| 2,738,499 | Sprick | Mar. 13, 1956 |
| 2,784,392 | Chaimowicz | Mar. 5, 1957 |
| 2,786,400 | Peery | Mar. 26, 1957 |
| 2,894,247 | Relis | July 7, 1959 |
| 2,905,927 | Reed | Sept. 22, 1959 |
| 2,942,778 | Broido | June 28, 1960 |
| 3,089,123 | Hennis et al. | May 7, 1963 |